(12) United States Patent
Lando

(10) Patent No.: US 8,151,389 B1
(45) Date of Patent: Apr. 10, 2012

(54) DIAPER CHANGING MAT FOR STROLLERS/CAR SEATS

(76) Inventor: Madelyn Lando, Millstone, NJ (US)

( * ) Notice: Subject to any disclaimer, the term of this patent is extended or adjusted under 35 U.S.C. 154(b) by 0 days.

(21) Appl. No.: 13/034,486

(22) Filed: Feb. 24, 2011

(51) Int. Cl.
*B68G 5/00* (2006.01)
*A47C 16/00* (2006.01)

(52) U.S. Cl. ................... 5/655; 5/655.9; 5/657

(58) Field of Classification Search .......... 5/652, 653, 5/655, 655.9, 656, 657
See application file for complete search history.

(56) References Cited

U.S. PATENT DOCUMENTS

| | | | |
|---|---|---|---|
| 4,987,625 A * | 1/1991 | Edelson | 5/657 |
| D330,139 S | 10/1992 | Bloom | |
| 5,448,790 A * | 9/1995 | Saro et al. | 5/657 |
| 6,224,152 B1 | 5/2001 | Hughes et al. | |
| 6,327,726 B1 | 12/2001 | Weber | |
| 6,421,856 B1 | 7/2002 | Furnback | |
| 6,773,065 B1 | 8/2004 | Stamper | |
| 7,350,252 B2 | 4/2008 | Telegadis et al. | |
| 2003/0097713 A1 * | 5/2003 | Kinchen et al. | 5/652 |
| 2004/0025254 A1 | 2/2004 | McCarthy | |

* cited by examiner

*Primary Examiner* — Jonathan Liu

(57) ABSTRACT

A baby changing mat adapted for fitting onto a stroller seat or car seat. The mat comprises an upper pad and a lower pad. The upper pad has a head end 112 and a foot end. The lower pad has a head end and a foot end. In some embodiments, the foot end of the upper pad pivotably connects with the head end of the lower pad. The upper pad has a generally a uniform thickness stretching from the head end to the foot end of the upper pad. In some embodiments, the head end of the lower pad has a thickness the same that of the foot end of the upper pad, and the thickness gradually increases towards the foot end of the lower pad to form a wedge.

1 Claim, 4 Drawing Sheets

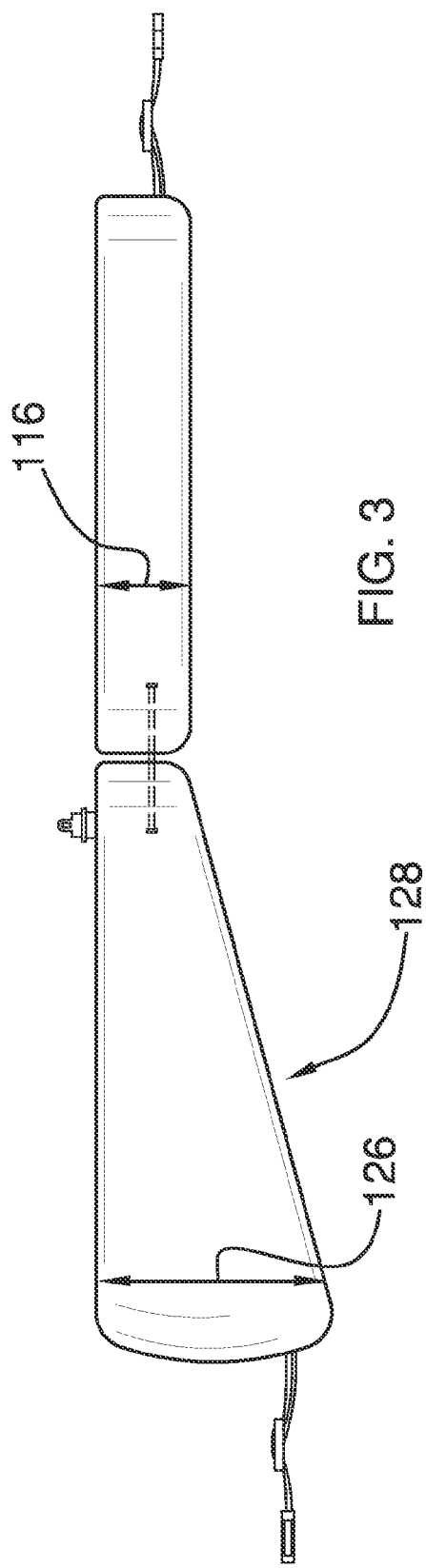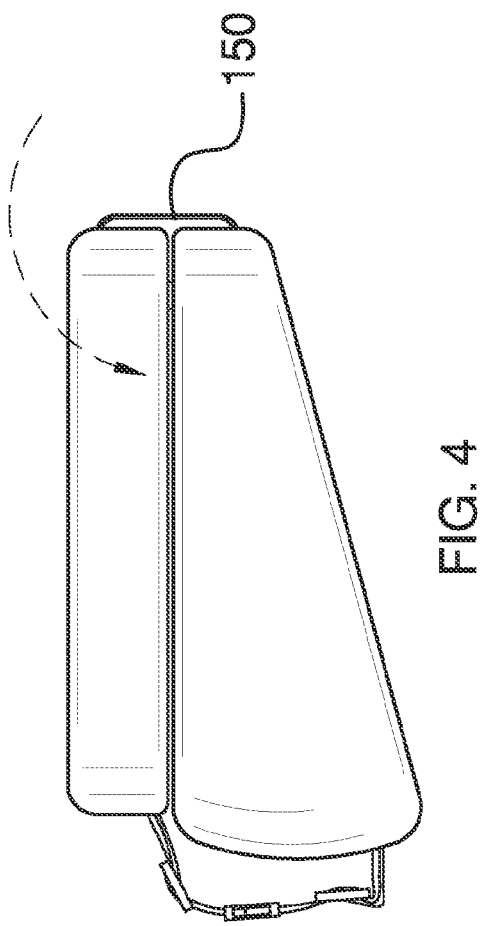

US 8,151,389 B1

DIAPER CHANGING MAT FOR STROLLERS/CAR SEATS

BACKGROUND OF THE INVENTION

The present invention allows for a convenient diaper change for a baby without having to worry about baking for a public changing station. The mat of the present invention is uniquely shaped as to be able to properly fit into a car seat or a stroller seat.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 3 is a side view of the mat in an open/unfolded position.

FIG. 4 is a side view of the mat in a closed/folded position.

DESCRIPTION OF PREFERRED EMBODIMENTS

Figure 1:
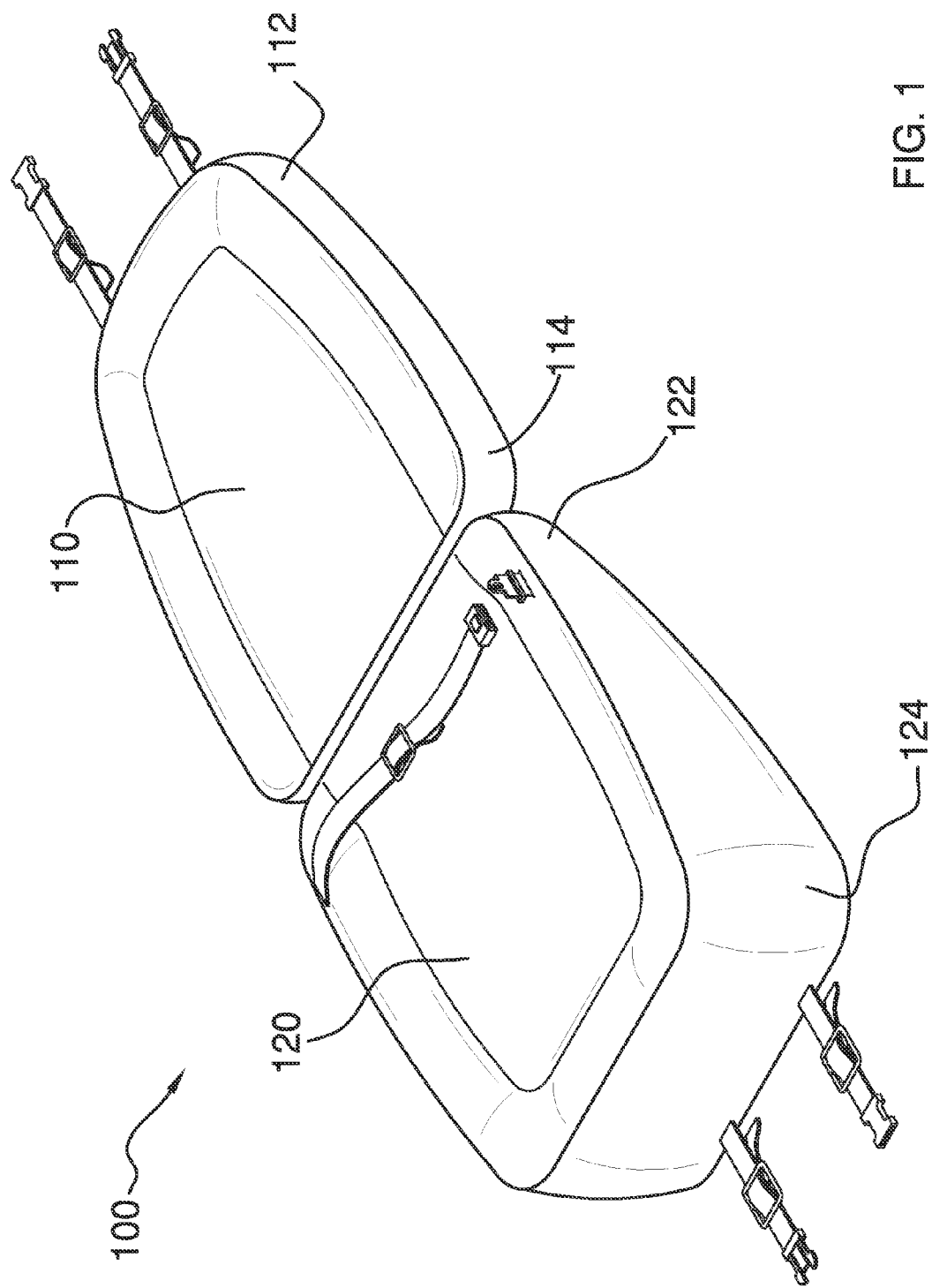
FIG. 1 is a perspective view of the mat in an open position.
Figure 2:
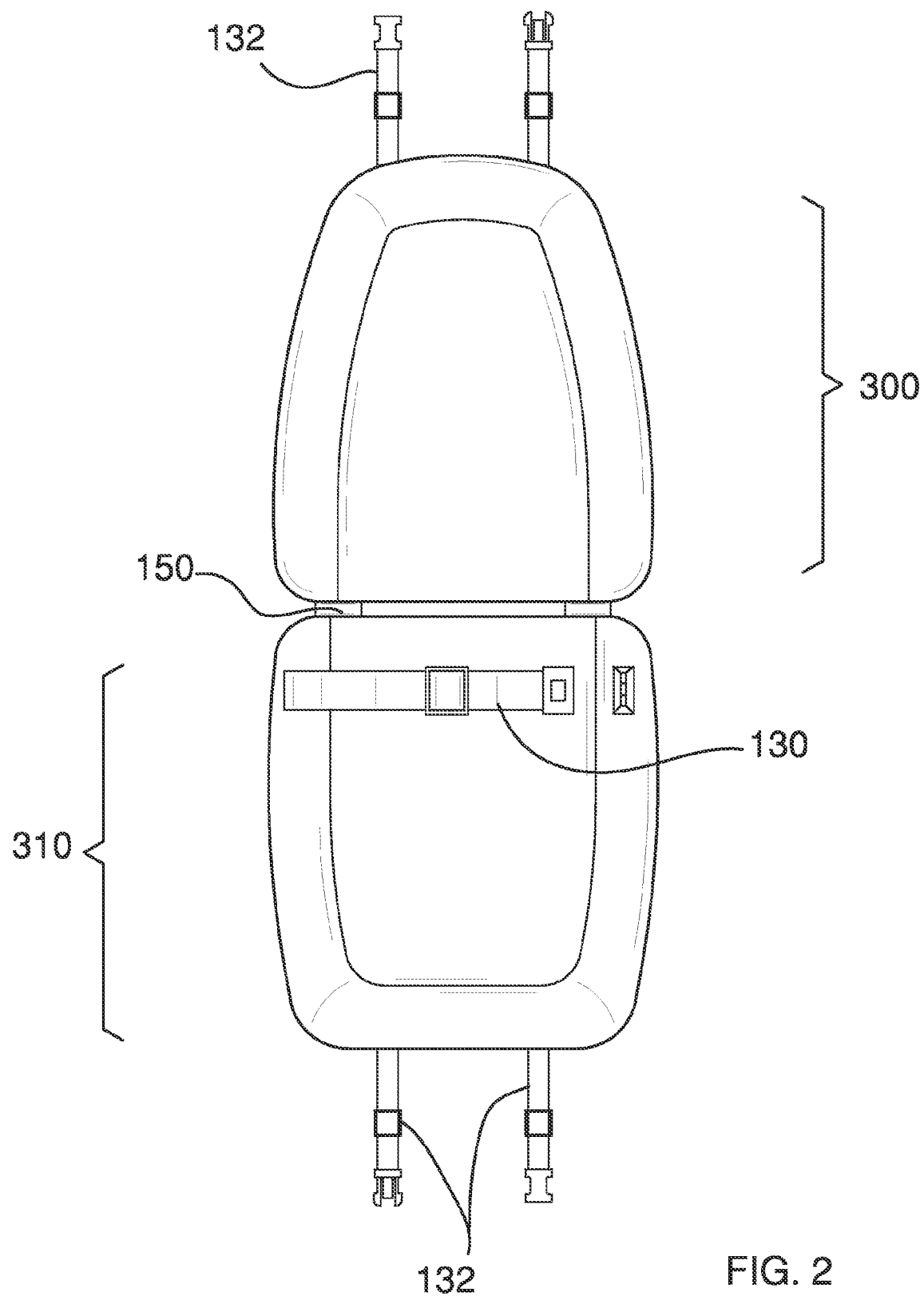
FIG. 2 is a top view of the mat in an open/unfolded position.
Figure 5:
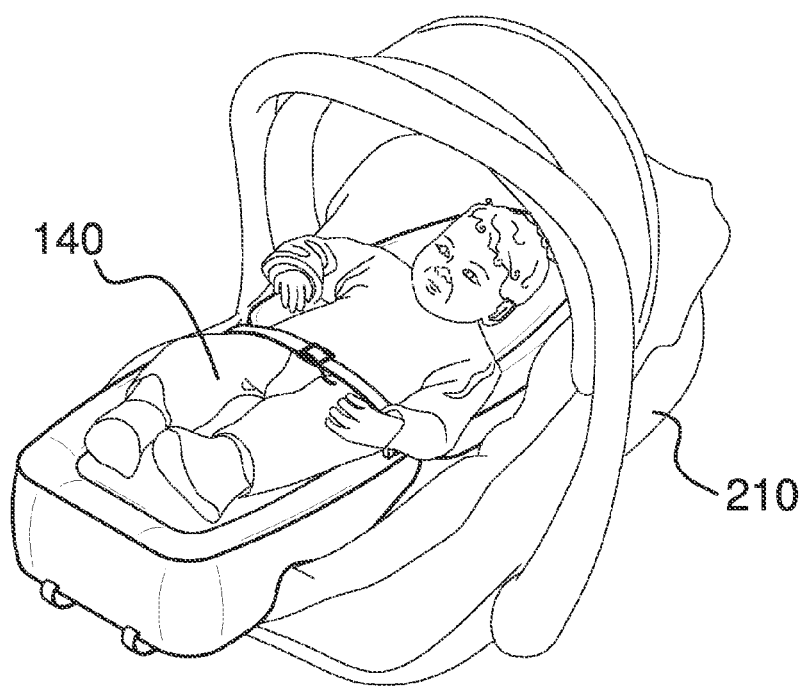
FIG. 5 is a perspective view of the mat in an open position and being snuggly fitted onto a car seat.
Figure 6:
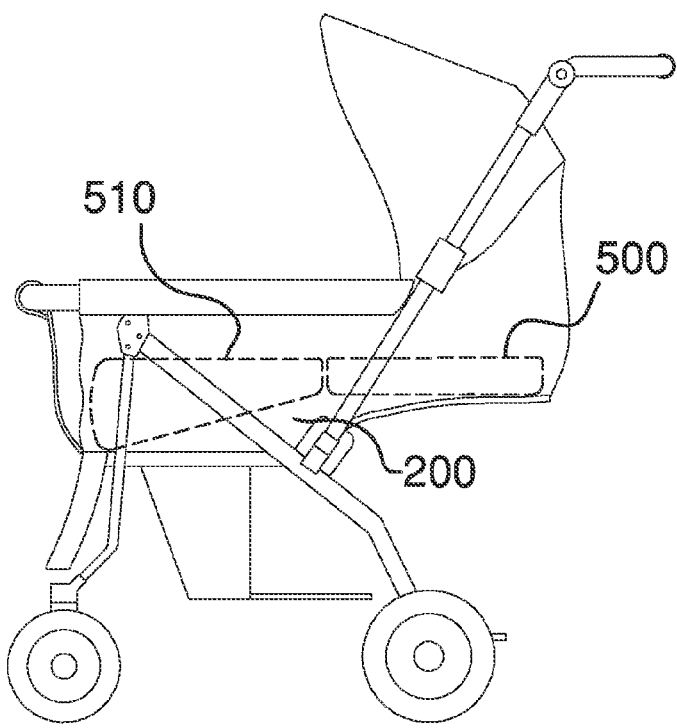
FIG. 6 is a perspective view of the mat in an open position and being snuggly fitted onto a stroller seat, where the mat is in a flat horizontal position.

Referring now to FIGS. 1-6, the present invention features a baby changing mat 100 adapted for fitting onto a stroller seat 200 or car seat 210. The mat comprises an upper pad 110 and a lower pad 120. The upper pad 110 has a head end 112 and a foot end 114. The lower pad 120 has a head end 122 and a foot end 124. In some embodiments, the foot end of the upper pad 114 pivotably connects with the head end of the lower pad 122. In some embodiments, the mat is made from a foam material, such as a memory foam material.

In some embodiments, the upper pad 110 has a generally a uniform thickness 116 stretching from the head end 112 to the foot end 114 of the upper pad. For example, the uniform thickness may be from about ½ to about 4 inches. In some embodiments, the head end 122 of the lower pad has a thickness 126 the same that of the foot end 114 of the upper pad, and the thickness 126 gradually increases towards the foot end 124 of the lower pad to form a wedge 128. The foot end of the lower pad may have a thickness of up to about 8 inches. For example, the head end of the upper pad may have a thickness of about ½ an inch (same as that of the foot end of the upper pad), and then gradually increases to about 4 to 8 inches at the foot end of the lower pad.

The wedge 128 of the lower pad allows the mat 100 to properly fit onto the top surface of a car seat 210 or a stroller seat 200, where the mat would be flat and generally horizontal. That is the wedge 128 allows for the top surface 500 of the upper pad and top surface 510 lower pad to be generally on the same plane.

The wedge 128 of the lower pad allows for the mat 100 to be generally flat when it is unfolded and placed onto a stroller seat 200 or a car seat 210. The lower pad 120 comprises a belt 130 for securing a baby 140 onto the mat 100.

In some embodiments, the upper pad 110 can be folded over the lower pad 120, and the head end 112 of the upper pad and the foot end 124 of the lower pad are linked together by a strap 132. In some embodiments, there is one strap 132 on the upper pad 110 and one strap on the lower pad 120. In some embodiments, there is more than one strap 132 on the upper pad 110 and more than one strap on the lower pad 120. In some embodiments, the length 300 of the upper pad is the same as that of the length 310 of the lower pad. In some embodiments, the length of the upper and lower pads are about 12 to 16 inches.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A baby changing mat (100) for use with a stroller seat (200), or a car seat (210), said mat (100) comprising:

(a) an upper pad (110) having an upper head end (112), an upper foot end (114), and an upper pad top surface (500), wherein said upper head end comprises a first plurality of straps (132), and wherein said upper pad (110) comprises a generally uniform thickness from the upper head end (112) to the upper foot end (114); and (b) a lower pad (120) having a lower head end (122), a lower foot end (124) and a lower pad top surface (510), wherein said lower foot end comprises a second plurality of straps (132), wherein said lower head end (122) comprises a thickness equal to the upper foot end (114), wherein said lower foot end (124) comprises a thickness greater than the lower head end (122), and wherein a cross-sectional area of a side of the thickness of the lower pad (120) with the lower pad top surface (510) facing upward comprises a wedge (128);

wherein the upper foot end (114) pivotably connects to the lower head end (122) via a hinge (150);

wherein when the baby changing mat (100) is disposed on a stroller seat (200) having the upper pad top surface (500) facing upward and the lower pad top surface (510) facing upward, said upper pad top surface (500) and said lower pad top surface (510) are generally level with respect to the earth, said upper pad top surface (500) and said lower pad top surface (510) are generally planar with respect to each other;

wherein when the baby changing mat (100) is disposed on a car seat (210) with the upper pad top surface (500) facing upward and the lower pad top surface (510) facing upward, said upper pad top surface (500) and said lower pad top surface (510) are generally level with respect to the earth, said upper pad top surface (500) and said lower pad top surface (510) are generally planar with respect to each other;

wherein the lower pad (120) further comprises a belt (130) disposed on said lower pad top surface, for securing a baby (140) onto the mat (100); and wherein when the upper pad (110) is folded at the hinge (150) against the lower pad (120) into a closed position, the upper pad top surface (500) faces the lower pad top surface (510), and the mat is maintained in the closed position via engagement of the first plurality of straps with the second plurality of straps.

\* \* \* \* \*